US012751898B2

(12) United States Patent
Ryan et al.

(10) Patent No.: US 12,751,898 B2
(45) Date of Patent: Oct. 6, 2026

(54) NEEDLELESS VIAL STOPPER

(71) Applicant: Becton, Dickinson and Company, Franklin Lakes, NJ (US)

(72) Inventors: Kevin M. Ryan, Whitehouse Station, NJ (US); Angela Marie Huenerfauth, Morris Plains, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 224 days.

(21) Appl. No.: 18/688,442

(22) PCT Filed: Aug. 31, 2022

(86) PCT No.: PCT/US2022/042133
§ 371 (c)(1),
(2) Date: Mar. 1, 2024

(87) PCT Pub. No.: WO2023/034366
PCT Pub. Date: Mar. 9, 2023

(65) Prior Publication Data

US 2024/0390229 A1 Nov. 28, 2024

Related U.S. Application Data

(60) Provisional application No. 63/240,015, filed on Sep. 2, 2021.

(51) Int. Cl.

| | |
|---|---|
| ***A61J 1/14*** | (2023.01) |
| ***A61J 1/20*** | (2006.01) |
| *A61J 1/05* | (2006.01) |

(52) U.S. Cl.
CPC ........... *A61J 1/1406* (2013.01); *A61J 1/2096* (2013.01); *A61J 1/05* (2013.01)

(58) Field of Classification Search
CPC .......... A61J 1/1406; A61J 1/2096; A61J 1/05; A61J 1/20; A61M 39/10;
(Continued)

(56) References Cited

U.S. PATENT DOCUMENTS 5,433,330 A * 7/1995 Yatsko ................. B65D 51/222 215/249
2003/0015491 A1 1/2003 Melrose et al.
(Continued)

FOREIGN PATENT DOCUMENTS

WO WO-0013723 A2 * 3/2000 ............ A61M 5/283
WO 2021150453 A1 7/2021
WO WO2025063289 A1 3/2025

*Primary Examiner* — Susan S Su
*Assistant Examiner* — Erin A Kim
(74) *Attorney, Agent, or Firm* — The Webb Law Firm

(57) ABSTRACT

A needleless vial stopper for a vial defining a vial opening includes a body having a first end and a second end positioned opposite the first end, with the body including a sealing portion and a flange extending radially outward from the sealing portion. The sealing portion is configured to be received by the vial opening and form a seal with the vial. The body defines an opening having a first open position prior to insertion of the sealing portion into the vial opening, a closed position after insertion of the sealing portion into the vial opening, and a second open position when engaged with a luer of a needleless syringe.

14 Claims, 5 Drawing Sheets

(58) Field of Classification Search
CPC .. A61M 2039/1072; A61M 2039/1077; A61M 2039/2426; A61M 2039/262
See application file for complete search history.

(56) References Cited

U.S. PATENT DOCUMENTS

| | | | |
|---|---|---|---|
| 2005/0159724 | A1 | 7/2005 | Enerson |
| 2008/0262465 | A1 | 10/2008 | Zinger et al. |
| 2015/0008664 | A1 | 1/2015 | Tachizaki |
| 2023/0338237 | A1 | 10/2023 | Yan et al. |

* cited by examiner

NEEDLELESS VIAL STOPPER

CROSS-REFERENCE TO RELATED APPLICATIONS

This application is the United States national phase of International Application No. PCT/US2022/042133 filed Aug. 31, 2022, and claims priority to U.S. Provisional Application Ser. No. 63/240,015, entitled "Needleless Vial Stopper", filed Sep. 2, 2021, the entire disclosures of which are hereby incorporated by reference in their entireties.

BACKGROUND OF THE INVENTION

Field of the Disclosure

The present disclosure relates generally to a needleless vial stopper.

Description of the Related Art

Medication vials require a needle to access the medication contained within the vial. Using a needle for vial access, however, requires multiple steps, including removing the needle from the packaging, attaching the needle to a needle-free IV luer syringe, removing the needle cover, inserting the needle into the medication vial, removing the needle, replacing the cap on the needle, removing the needle from the syringe, and disposing of the needle. Further, using a needle to draw or add solution to a medication vial is not ideal, because the outside needle diameter has to be small enough such that it does not make a significant hole in the vial stopper during insertion to prevent stopper leakage after removing the needle from the vial stopper. This outside needle diameter restriction translates to an even smaller inside diameter (fluid path) for the needle, which increases the flow resistance (lower flow rate) during transfer of fluid between the syringe and the vial. The restricted flow rate increases the total time the clinician or pharmacist needs to transfer the medication and also increase the hand forces required to actuate the plunger rod of the syringe.

One solution to eliminate the use of needles is to utilize a needle-free vial spike adapter. The vial spike adapter provides vial access using a needle-free IV luer syringe. The needle-free vial spike adapter includes a valve element that opens when engaged with the needle-free IV luer syringe. Needle-free vial spike adapters, however, add additional costs compared to the use of a needle.

SUMMARY OF THE INVENTION

In one aspect or embodiment, a needleless vial stopper for a vial defining a vial opening includes a body having a first end and a second end positioned opposite the first end, with the body including a sealing portion and a flange extending radially outward from the sealing portion. The sealing portion is configured to be received by the vial opening and form a seal with the vial. The body defines an opening having a first open position prior to insertion of the sealing portion into the vial opening, a closed position after insertion of the sealing portion into the vial opening, and a second open position when the body is engaged with a luer of a needleless syringe.

The sealing portion may be oval-shaped in a cross-section extending perpendicular to a longitudinal axis of the body. The sealing portion may be circular in a cross-section extending perpendicular to a longitudinal axis of the body.

The sealing portion may include an annular sealing rib. The opening of the body may have a width of 0.0-0.020 inches when the opening is in the first open position. The flange may be configured to engage a top surface of a neck of the vial.

The body may define a first passageway extending from the first end of the body to a position intermediate the first and second ends of the body and a second passageway extending from the second end of the body to a position intermediate the first and second ends of the body. The first passageway and the second passageway may each comprise a frustoconical surface. The opening of the body may be positioned between the first passageway and the second passageway. The sealing portion may include a transverse passageway extending in a direction perpendicular to a longitudinal axis of the body. The transverse passageway may extend across an entire diameter of the sealing portion. A maximum diameter of the sealing portion of the body may be larger than a diameter of the vial opening of the vial. The opening of the body may be configured such that fluid can flow through the opening in the first and second open positions of the opening and cannot flow through the opening in the closed position of the opening. The body may be formed from an elastomeric material.

In a further aspect or embodiment, a needleless vial stopper for a vial defining a vial opening includes a body having a first end and a second end positioned opposite the first end, with the body including a sealing portion and a flange extending radially outward from the sealing portion. The sealing portion is configured to be received by the vial opening and form a seal with the vial. The body defines a frangible section configured to define an opening through the body upon engagement with a luer of a needleless luer syringe, with the opening configured to move to a closed position when not engaged with the luer of the needleless luer syringe.

BRIEF DESCRIPTION OF THE DRAWINGS

The above-mentioned and other features and advantages of this disclosure, and the manner of attaining them, will become more apparent and the disclosure itself will be better understood by reference to the following descriptions of aspects of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION

Figure 1:
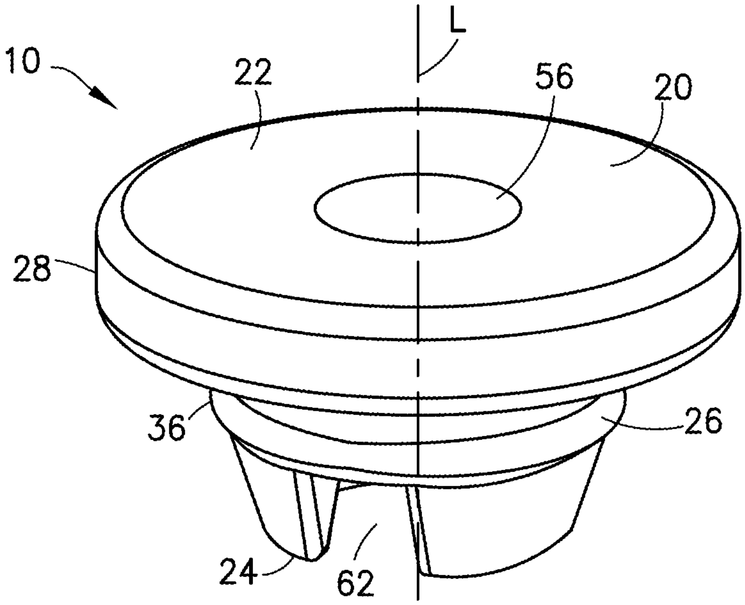
FIG. 1 is a top perspective view a needleless vial stopper according to one aspect or embodiment of the present application.
Figure 2:
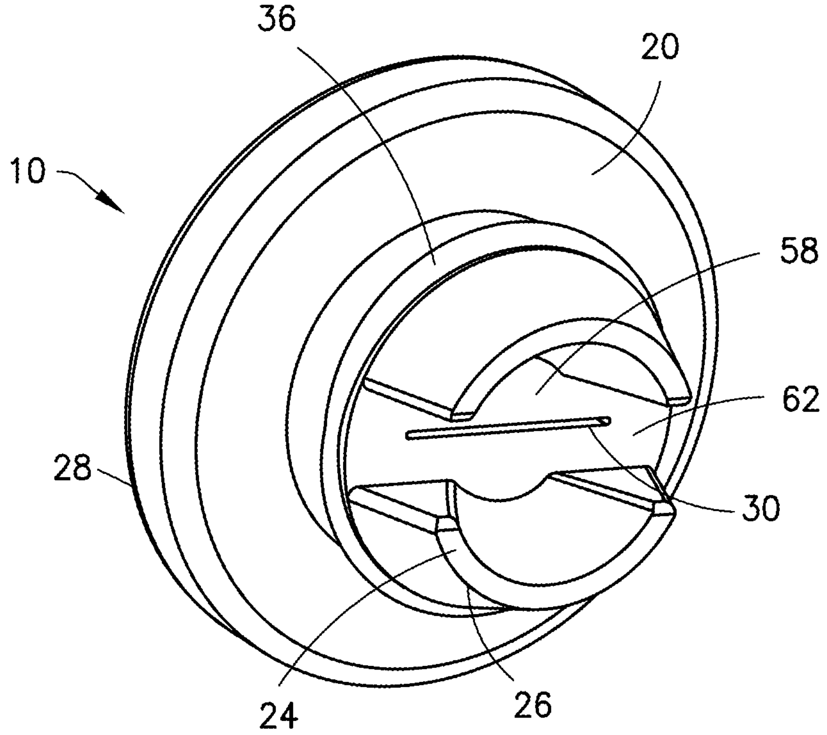
FIG. 2 is a bottom perspective view of the needleless vial stopper of FIG. 1.
Figure 3:
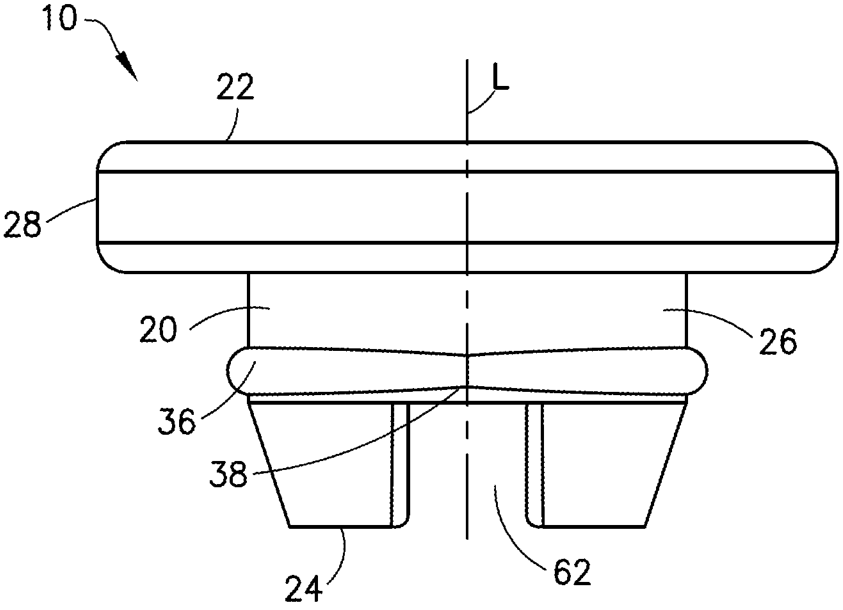
FIG. 3 is a side view of the needleless vial stopper of FIG. 1.
Figure 4:
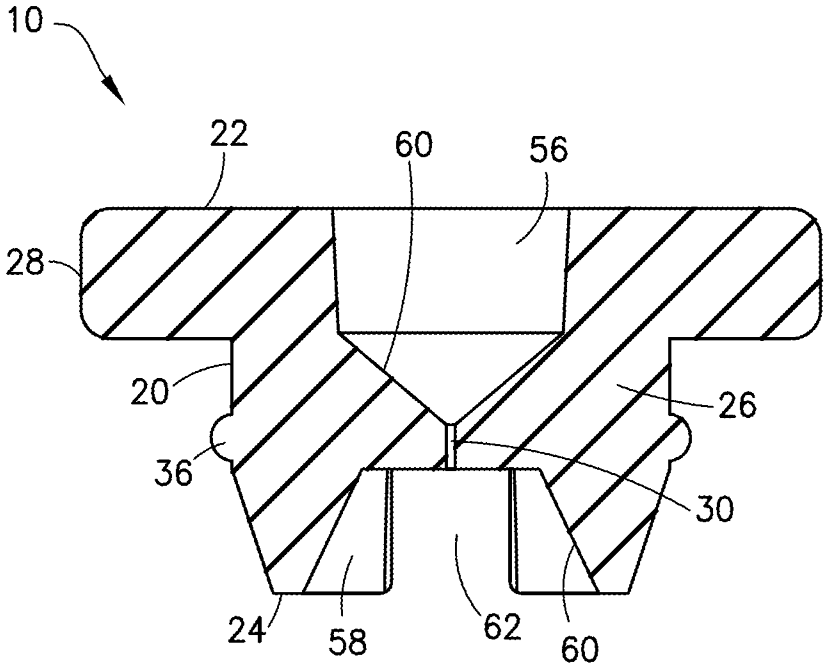
FIG. 4 is a cross-sectional view of the needleless vial stopper of FIG. 1.
Figure 5:
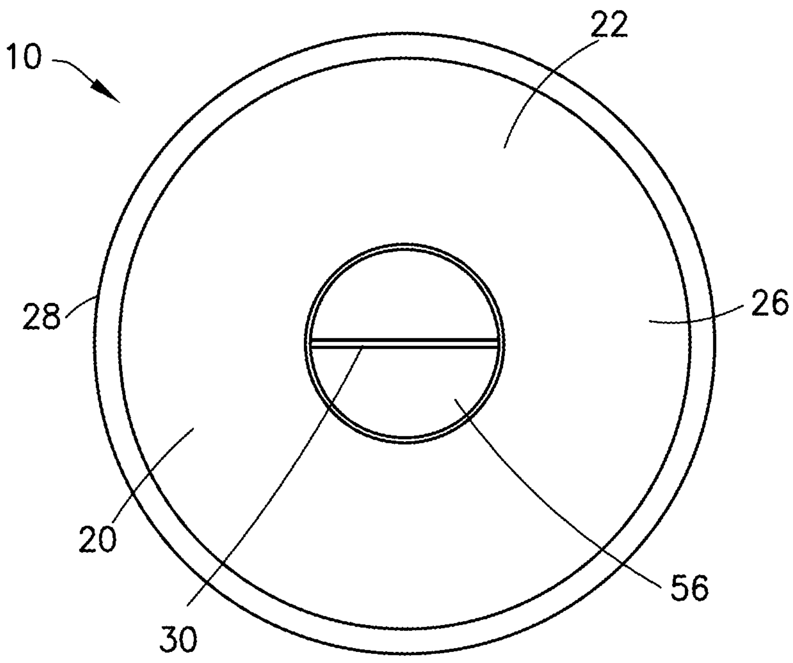
FIG. 5 is a top view of the needleless vial stopper of FIG. 1.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms “upper”, “lower”, “right”, “left”, “vertical”, “horizontal”, “top”, “bottom”, “lateral”, “longitudinal”, and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Unless otherwise indicated, all ranges or ratios disclosed herein are to be understood to encompass the beginning and ending values and any and all subranges or subratios subsumed therein. For example, a stated range or ratio of “1 to 10” should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

Figure 6:
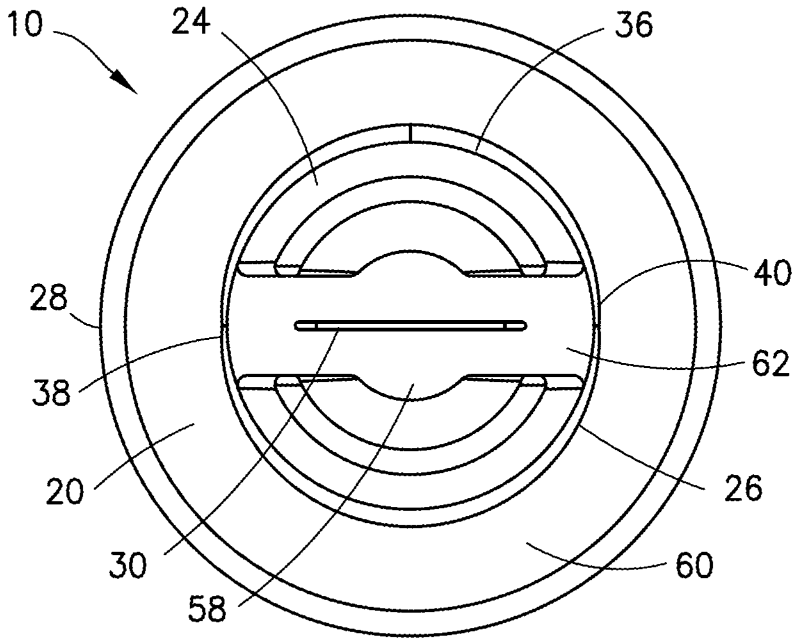
FIG. 6 is a bottom view of the needleless vial stopper of FIG. 1
Figure 7:
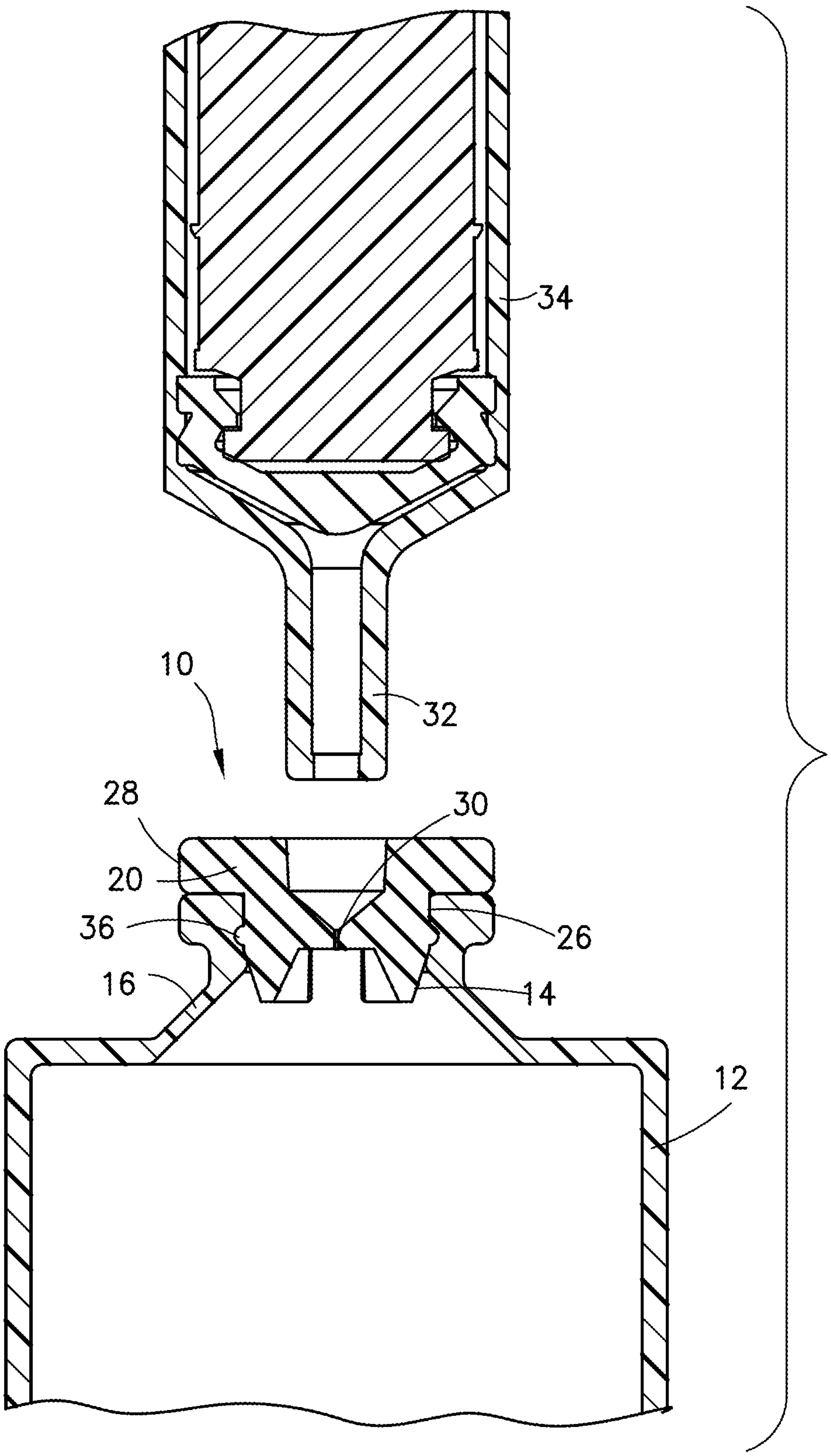
FIG. 7 is a cross-sectional view of the needleless vial stopper of FIG. 1, showing the needleless vial stopper inserted into a vial.
Figure 8:
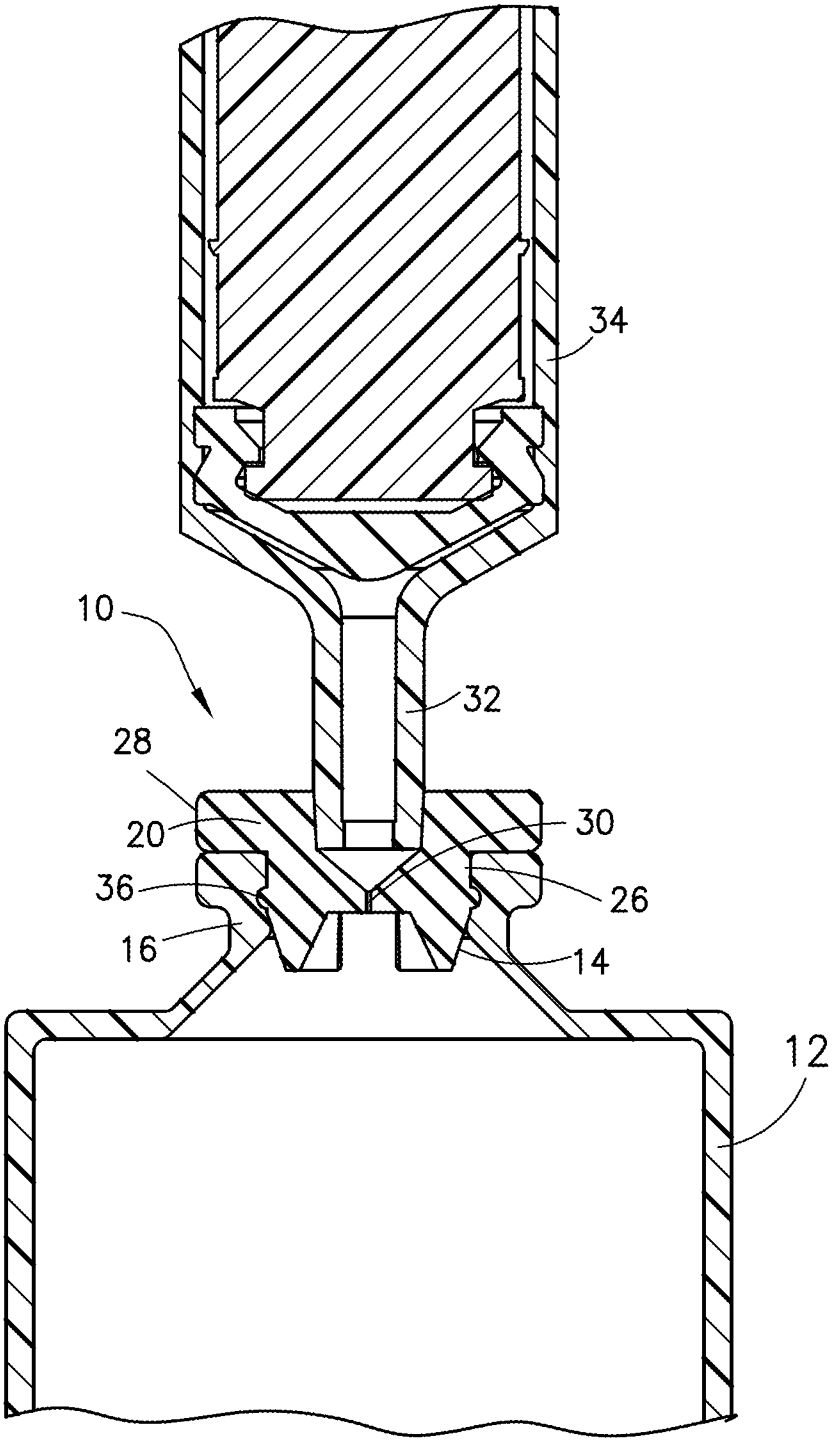
FIG. 8 is a cross-sectional view of the needleless vial stopper of FIG. 1, showing the needleless vial stopper inserted into a vial and a needleless IV luer syringe inserted into the needleless vial stopper.

Referring to FIGS. 1-8, a needleless vial stopper 10 for a vial 12 defining a vial opening 14, includes a body 20 having a first end 22 and a second end 24 positioned opposite the first end 22. The body 20 includes a sealing portion 26 and a flange 28 extending radially outward from the sealing portion 26, with the sealing portion 26 configured to be received by the vial opening 14 and form a seal with the vial 12. The body 20 defines an opening 30 having a first open position prior to insertion of the sealing portion 26 into the vial opening 14, a closed position after insertion of the sealing portion 26 into the vial opening 14, and a second open position when the body 20 is engaged with a luer 32 of a needleless syringe 34. Accordingly, the needleless vial stopper 10 is configured to allow access to the contents of the vial 12, when the needleless vial stopper 10 is positioned within the vial opening 14, without the use of a needle. As shown in FIGS. 7 and 8, engaging the needleless vial stopper 10 with the luer 32 of the needleless syringe 34 opens the opening 30 to the second open position to allow fluid communication between the needleless syringe 34 and the vial 12. When the luer 32 of the needleless syringe 34 is withdrawn from the needleless vial stopper 10, the needleless vial stopper 10 returns to the closed position to seal the vial opening 14. The flange 28 of the body 20 is configured to engage a top surface of a neck 16 of the vial 12.

As shown in FIG. 6, in one aspect or embodiment, the sealing portion 26 is oval in a cross-section extending perpendicular to a longitudinal axis L of the body 20. Due to the oval shape of the sealing portion 26, when the sealing portion 26 is inserted into the vial opening 14 of the vial 12, the sealing portion 26 is compressed to fit the circular or cylindrical shape of the vial opening 14 thereby creating a biasing force acting to close the opening 30. Inserting the luer 32 of the needleless syringe 34 into the needleless vial stopper 10 opens the opening 30 with the opening 30 closing upon withdrawal of the luer 32 of the needleless syringe 34 due to the forces caused by compression of the sealing portion 26 within the vial opening 14. In further aspects or embodiments, the sealing portion 26 may have other suitable shapes, such as a circular shape. In one aspect or embodiment, a maximum diameter of the sealing portion 26 of the body 20 is larger than a diameter of the vial opening 14 of the vial 12.

Referring to FIGS. 1-4, the sealing portion 26 includes an annular sealing rib 36. In one aspect or embodiment, the annular sealing rib 36 is semi-spherical. The annular sealing rib 36 tapers in width in a circumferential direction. The annular sealing rib 36 may include one or more tapered portions 38, 40. In one aspect or embodiment, the annular sealing rib 36 includes a first tapered portion 38 and a second tapered portion 40 positioned 180 degrees from the first tapered portion 38.

Referring to FIGS. 1-6, the opening 30 of the body 20 has a width of 0.000-0.020 inches when the opening 30 is in the first open position. After insertion of the sealing portion 26 within the vial opening 14 of the vial 12, the opening 30 is closed and/or further biased to the closed position. The opening 30 of the body 20 is configured such that fluid can flow through the opening 30 in the first and second open positions of the opening 30 and cannot flow through the opening 30 in the closed position of the opening 30. In one aspect or embodiment, the body 20 defines a first passageway 56 extending from the first end 22 of the body 20 to a position intermediate the first and second ends 22, 24 of the body 20, and the body 20 defines a second passageway 58 extending from the second end 24 of the body 20 to a position intermediate the first and second ends 22, 24 of the body 20. The first passageway 56 and the second passageway 58 each include a frustoconical surface 60, although other suitable arrangements may be utilized. The opening 30 of the body 20 is positioned between the first passageway 56 and the second passageway 58. Further, in one aspect or embodiment, the sealing portion 26 includes a transverse passageway 62 extending in a direction perpendicular to the longitudinal axis L of the body 20. The transverse passageway 62 extends across an entire diameter of the sealing portion 26, although other suitable arrangements may be utilized. The body 20 may be formed from an elastomeric material.

In a further aspect or embodiment, rather than providing the opening 30, the body 20 defines a frangible section (not shown) configured to define an opening through the body upon engagement with the luer of the needleless luer syringe 34, with the opening configured to move to a closed position when not engaged with the luer 32 of the needleless luer syringe 34. In other words, the body 20 may define a small section material that is perforated and/or frangible such that an opening is formed upon insertion of the luer of the needleless luer syringe into the frangible section.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims. To the extent possible, one or more features of any aspect or embodiment discussed above can be combined with one or more features of any other aspect or embodiment.

What is claimed is:

1. A needleless vial stopper for a vial defining a vial opening, the needleless vial stopper comprising:

a body having a first end and a second end positioned opposite the first end, the body comprising a sealing portion and a flange extending radially outward from the sealing portion, the sealing portion configured to be received by the vial opening and form a seal with the vial, wherein the body defines an opening having a first open position prior to insertion of the sealing portion into the vial opening, a closed position after insertion of the sealing portion into the vial opening, and a second open position when the body is engaged with a luer of a needleless syringe, wherein the sealing portion is oval-shaped in a cross-section extending perpendicular to a longitudinal axis of the body when the body is at rest in the first open position prior to insertion of the sealing portion into the vial opening.

2. The needleless vial stopper of claim 1, wherein the sealing portion is circular in a cross-section extending perpendicular to a longitudinal axis of the body when the body is compressed in the closed position after insertion of the sealing portion into the vial opening.

3. The needleless vial stopper of claim 1, wherein the sealing portion comprises an annular sealing rib.

4. The needleless vial stopper of claim 1, wherein the opening of the body has a width of 0.0-0.020 inches when the opening is in the first open position.

5. The needleless vial stopper of claim 1, wherein the flange is configured to engage a top surface of a neck of the vial.

6. The needleless vial stopper of claim 1, wherein the body defines a first passageway extending from the first end of the body to a position intermediate the first and second ends of the body, and wherein the body defines a second passageway extending from the second end of the body to a position intermediate the first and second ends of the body.

7. The needleless vial stopper of claim 6, wherein the first passageway and the second passageway each comprise a frustoconical surface.

8. The needleless vial stopper of claim 6, wherein the opening of the body is positioned between the first passageway and the second passageway.

9. The needleless vial stopper of claim 1, wherein the sealing portion comprises a transverse passageway extending in a direction perpendicular to a longitudinal axis of the body.

10. The needleless vial stopper of claim 9, wherein the transverse passageway extends across an entire diameter of the sealing portion.

11. The needleless vial stopper of claim 1, wherein a maximum diameter of the sealing portion of the body is larger than a diameter of the vial opening of the vial.

12. The needleless vial stopper of claim 1, wherein the opening of the body is configured such that fluid can flow through the opening in the first and second open positions of the opening and cannot flow through the opening in the closed position of the opening.

13. The needleless vial stopper of claim 1, wherein the body comprises an elastomeric material.

14. A needleless vial stopper for a vial defining a vial opening, the needleless vial stopper comprising:

a body having a first end and a second end positioned opposite the first end, the body comprising a sealing portion and a flange extending radially outward from the sealing portion, the sealing portion configured to be received by the vial opening and form a seal with the vial, wherein the body defines a frangible section configured to define an opening through the body upon engagement with a luer of a needleless luer syringe such that the opening is formed by breaking apart the frangible portion upon insertion of the luer into the frangible section, the opening configured to move to a closed position when not engaged with the luer of the needleless luer syringe.

* * * * *